United States Patent [19]

Pollack

[11] Patent Number: 4,563,780
[45] Date of Patent: Jan. 14, 1986

[54] AUTOMATED BATHROOM

[76] Inventor: Simcha Z. Pollack, 1561 52nd St., New York, N.Y. 11219

[21] Appl. No.: 508,826

[22] Filed: Jun. 29, 1983

[51] Int. Cl.$^4$ ............................................. E03C 1/04
[52] U.S. Cl. ......................................... 4/192; 4/191; 4/546; 4/597; 4/605; 4/559; 137/392; 137/468
[58] Field of Search .................... 4/191, 192, 546, 538, 4/DIG. 3, 596–597, 605, 559, 545, 493, 598; 137/457, 468, 392; 236/53–64

[56] References Cited

U.S. PATENT DOCUMENTS

| | | | |
|---|---|---|---|
| 2,635,691 | 4/1953 | Filliung | 4/DIG. 3 |
| 2,908,017 | 10/1959 | Whaley | 4/192 X |
| 2,991,481 | 7/1961 | Book | 4/DIG. 3 |
| 3,358,747 | 12/1967 | Lesher et al. | 4/191 X |
| 3,391,547 | 7/1968 | Kingston | 137/392 X |
| 3,623,165 | 11/1971 | Whittell, Jr. | 4/493 X |
| 3,638,680 | 2/1972 | Kopp | 4/192 |
| 3,651,523 | 3/1972 | Miyahara et al. | 4/192 |
| 3,741,195 | 6/1973 | Ellis | 4/192 X |
| 3,837,016 | 9/1974 | Schindler et al. | 4/493 X |
| 3,938,741 | 2/1976 | Allison | 137/468 |
| 4,042,984 | 8/1977 | Butler | 4/538 X |
| 4,189,792 | 2/1980 | Veach | 4/192 |
| 4,409,694 | 10/1983 | Barrett, Sr. et al. | 4/598 X |
| 4,424,438 | 1/1984 | Antelman et al. | 4/559 X |
| 4,429,422 | 2/1984 | Wareham | 4/192 |
| 4,432,105 | 2/1984 | Pitroda | 4/605 |

FOREIGN PATENT DOCUMENTS 663643 12/1951 United Kingdom ................ 137/392

Primary Examiner—Henry K. Artis
Attorney, Agent, or Firm—Duffield & Lehrer

[57] ABSTRACT

An automatic computer controlled bathroom includes a shower, bathtub, sink and toilet which can all be electronically controlled. The sink and shower include water temperature sensors and valves which direct the water to the drain if it is outside of a predetermined temperature range. The temperature sensor also functions to adjust the hot and cold water supplies to bring the water to a desired temperature. A timer can be set to automatically close the bathtub drain and open the water supply at a predetermined time in the morning. Temperature sensors in the tub control the incoming water supplies to bring the bathtub water to a preselected temperature. A water level sensor stops the incoming water when the tub is filled. A similar level sensor prevents the toilet from overflowing by closing the water inlet in the event the wter in the toilet reaches a dangerous level. Each family member can select his desired temperatures, times and water flow rates associated with the shower, bathtub and sink and can store these values in the programmable computer. Thereafter, he can initiate the operation of any of the devices and the computer will ensure the proper temperature, time, water level, etc.

8 Claims, 4 Drawing Figures

AUTOMATED BATHROOM

BACKGROUND OF THE INVENTION

The present invention is directed toward an automated bathroom and more particularly toward an automatic computer controlled bathroom including a shower, bathtub, sink and toilet which can all be electronically controlled.

It is common practice in most residential buildings to locate the domestic hot water heater at some distance from the bathroom. As a result, if the hot water tap had not been utilized for some period of time, the water in the pipe between the heater and the bathroom will have decreased in temperature and would be at room temperature or below if the pipe were located in an exterior wall. Thus, when it is desired to utilize hot water, one must turn the hot water valve on and wait some considerable period of time for the water to reach proper temperature. This is not only annoying but can also be dangerous since the water coming from the faucet may suddenly become scalding hot.

A similar problem occurs when one wishes to take a shower. Initially adjusting the hot and cold water faucets for the shower may bring the combined water temperature close to the desired temperature. However, as the main portion of the hot water reaches the shower head from the hot water heater, the shower temperature can become extremely hot which, again, can cause burning.

A similar problem can occur in many installations when a large quantity of cold water is needed elsewhere in the house such as when a toilet has been flushed. This can result in a surge of hot water coming from the shower head. Of course, the reverse can also occur. That is, occasionally all of the hot water will be temporarily drawn off and a surge of cold water may be dispensed from the shower head.

Sudden surges of hot water from a shower or sink can, of course, be dangerous. But even minor changes in temperature are annoying as one must constantly be adjusting the hot and cold water to bring the temperature to some desired comfortable level.

Another problem occurs when one desires to take a bath. As all bathers are aware, it takes a considerable amount of time to fill a bathtub and this is particularly annoying when one wishes to take a bath in the morning as he or she may not have time to wait for the tub to fill. Furthermore, as the tub is being filled, one must constantly check the water temperature and adjust the incoming water to bring the bath temperature to the proper point.

Inventions have been proposed, such as shown in U.S. Pat. No. 4,042,984, for automatically controlling the water level in a bathtub. While this may help to relieve one of the problems associated with filling a tub, it does not alleviate the other problems described above.

SUMMARY OF THE INVENTION

The present invention is designed to overcome all of the various problems discussed above in connection with the operation of bathroom showers, tubs and sinks and is also capable of overcoming problems associated with the operation of a toilet. In accordance with the invention, all of these devices can be electronically controlled. The sink and shower include water temperature sensors and valves which direct the water to the drain if it is outside of a predetermined temperature range. The temperature sensor also functions to adjust the hot and cold water supplies to bring the water to a desired temperature. A timer can be set to automatically close the bathtub drain and open the water supply at a predetermined time in the morning. Temperature sensors in the tub control the incoming water supplies to bring the bathtub water to a preselected temperature. A water level sensor stops the incoming water when the tub is filled. A similar level sensor prevents the toilet from overflowing by closing the water inlet in the event the water in the toilet reaches a dangerous level. Each family member can select his desired temperatures, times and water flow rates associated with the shower, bathtub and sink and can store these values in the programmable computer or microprocessor. Thereafter, he can initiate the operation of any of the devices and the computer will ensure the proper temperature, time, water level, etc.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DETAILED DESCRIPTION OF THE PREFERRED EMBODIMENT

Figure 1:
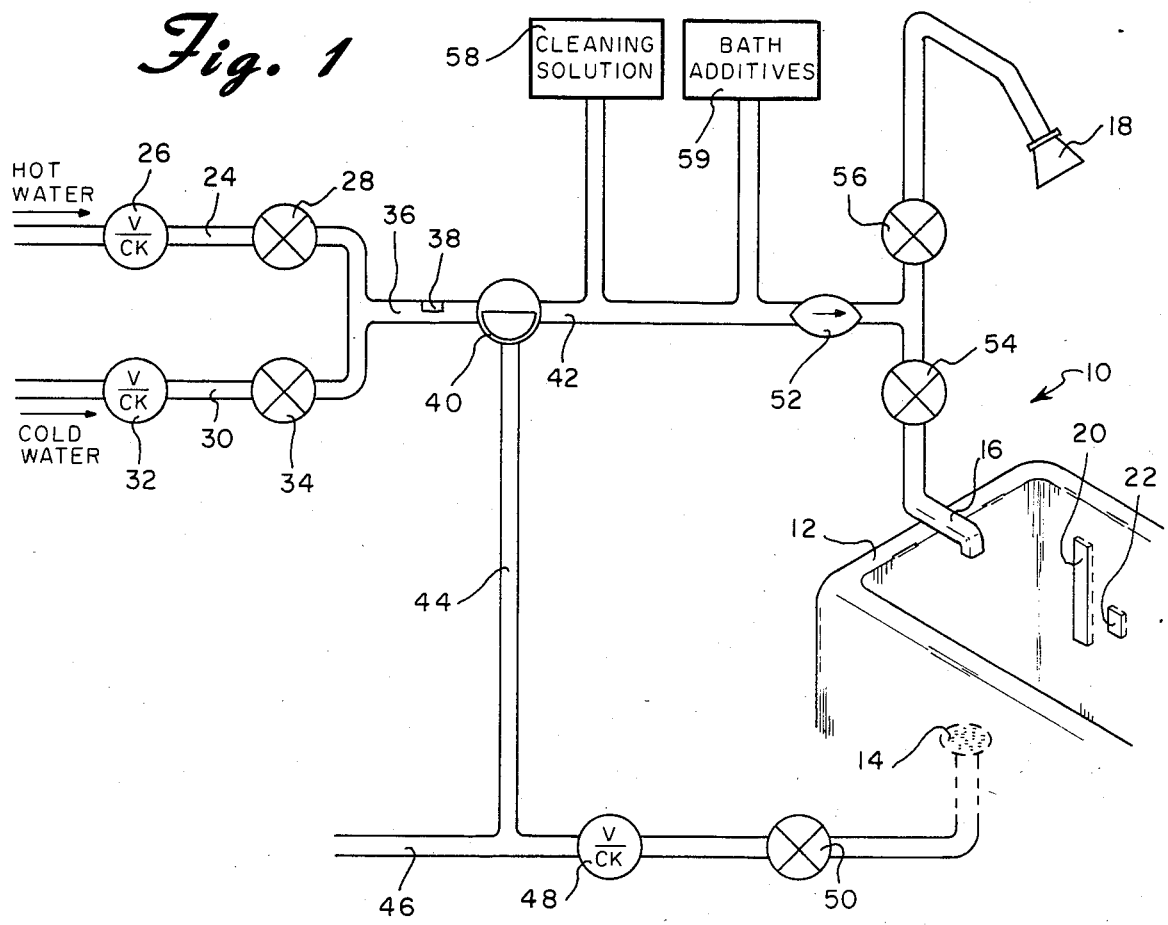
FIG. 1 is a schematic representation of a bathtub and shower being controlled by the control system of the present invention.

Referring now to the drawings in detail wherein, when possible, like reference numerals have been used throughout the various figures to designate like elements, there is shown in FIG. 1 a schematic representation of a bathtub and shower being controlled by the control system of the present invention and designated generally as 10. The system 10 includes a bathtub 12 of substantially standard construction and includes a drain 14, a faucet 16 and a shower head 18. Located within the bathtub 12 is a water level sensor 20 and a temperature sensor 22. These sensors are, per se, of conventional construction although they have not been heretofore employed in the presently described combination.

Hot water is supplied to the system in hot water supply line 24 through check valve 26 and electrically operated valve 28. Valve 28 is preferably of the type which can be opened or closed to various different degrees depending on the electrical signal applied thereto. Thus, if desired, valve 28 can be controlled to be totally closed, let a small amount of hot water pass, let a larger amount of water pass, be opened full or be opened to any other degree in between. Valve 28 may either be of the type which may be continuously opened and closed or it may be of the type which is capable of being opened and closed in a finite number of discrete steps.

Similarly, cold water is supplied in cold water supply line 30 through check valve 32 and electrically controlled valve 34. Valve 34 functions in substantially the identical manner as valve 28.

The hot and cold water supply lines are connected together to form a single water supply line 36. Located within the supply line 36 is a temperature sensor 38. Sensor 38 continuously monitors the hot and cold water mixture and generates an electrical signal which will be utilized to control the system as described hereinafter.

Following the temperature sensor 38 is an electrically operated diverter valve 40. Valve 40 is capable of directing incoming water from the supply line 36 to either the shower-bathtub line 42 or the drain line 44. From the drain line 44, water can flow to the drainpipe 46. A check valve 48 located between the bathtub drain 14 and the drain line 44 prevents water from the drain line 44 from flowing into the bathtub 12 and ensures that the same flows into the drainpipe 46. Also associated with the bathtub drain 14 is an electrically controlled valve 50. This is preferably a solenoid type valve which can be opened to allow water to drain from the tub 12 or closed when it is desired to fill the tub.

When diverter valve 40 allows water from the supply line 36 to pass into the line 42, it then passes through a water flow rate indicator or sensor 52. From there, the water may be directed either to the bathtub faucet 16 through electrically operated valve 54 or to the shower head 18 through electrically operated valve 56. Also located in the water supply line 42 is an electrically operated cleaning solution dispenser 58. The dispenser 58 is capable of dispensing cleaning solution into the line 42 so that it can be discharged through faucet 16 or shower head 18 when desired. A similar dispenser 59 can be employed for automatically adding bath oils or other additives.

Figure 2:
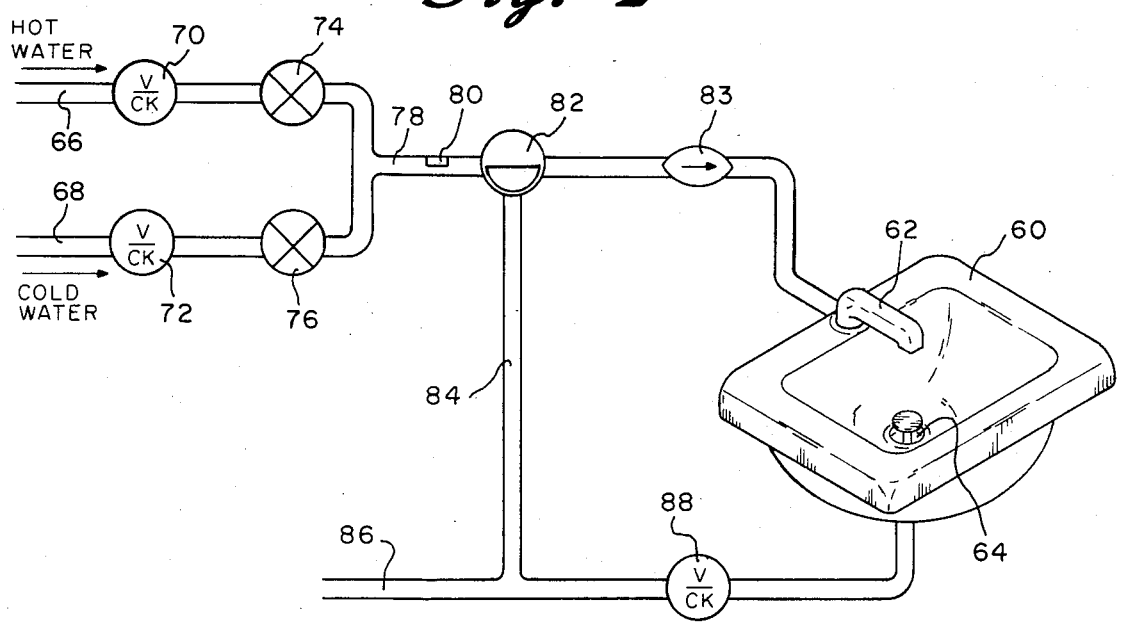
FIG. 2 is a schematic representation of a sink controlled by the system of the present invention.

FIG. 2 schematically represents a system similar to that shown in FIG. 1 but used in connection with a sink 60. The sink 60 includes a faucet 62 and a drain 64. Hot water is supplied to the system through hot water supply pipe 66 and cold water is supplied through pipe 68. Check valves 70 and 72 and electrically controlled variable flow valves 74 and 76 are provided in the lines 66 and 68 in a manner similar to that described in FIG. 1.

The hot and cold water supply lines are joined to form a single water supply line 78 within which is located a temperature sensor 80. Electrically operated diverter valve 82 is capable of allowing all of the water in line 78 to pass either to the faucet 62 through flow sensor 83 or directly to the drain line 84 and into the drainpipe 86. Check valve 88 located between the drain 64 and the drain line 84 prevents water from the supply line 78 from passing through the drain line 84 and into the sink 60 through drain 64.

Figure 3:
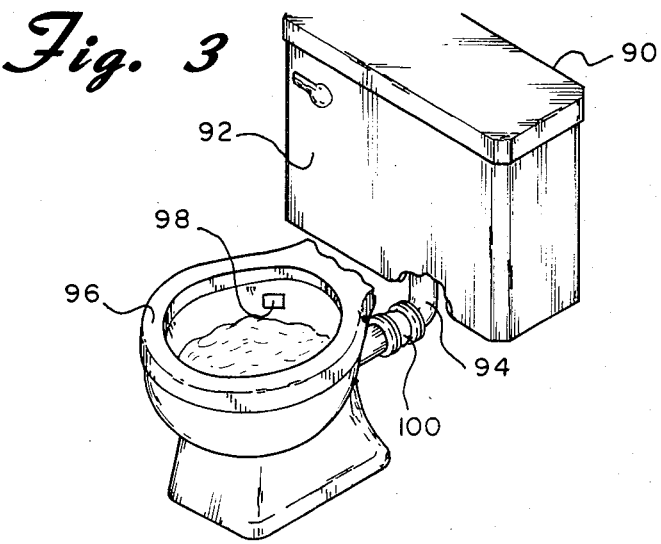
FIG. 3 is a schematic representation of a toilet being controlled by the present invention.

An additional feature of the system of the present invention is illustrated schematically in FIG. 3. This aspect of the invention provides a means for preventing the overflow of water when a toilet 90 is flushed. As the toilet is flushed, water from the tank 92 flows through a pipe 94 into the toilet bowl 96. Water level indicator 98 senses when water becomes abnormally high and, in accordance with the control system of the invention to be described hereinafter, closes the valve 100 in the pipe 94 to prevent further inflow of water to the bowl 96.

Figure 4:
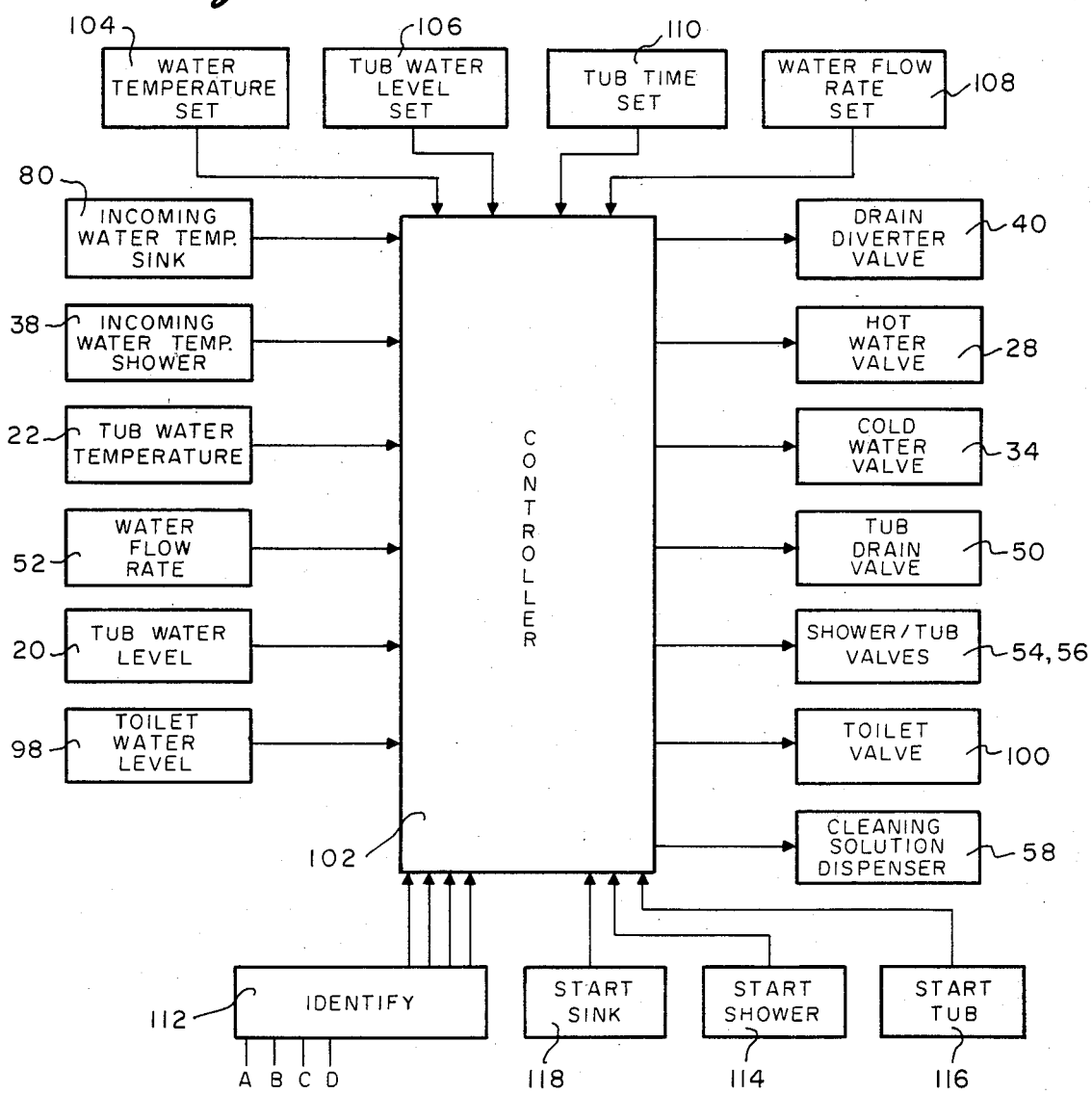
FIG. 4 is a schematic representation of a control system in accordance with the invention.

The control system for the present invention is shown schematically in FIG. 4. The system is comprised essentially of a microprocessor or computer 102. Various inputs to the computer 102 are shown to the left of FIG. 4 and include the temperature sensors 22, 38 and 80; the water flow rate indicator 52 and the level water indicators 20 and 98. These are shown by way of example only. It should be readily apparent to those skilled in the art that numerous other sensors and indicators could be utilized for sensing additional temperatures such as the ambient temperature and water temperatures at different locations in the system for providing additional inputs to the computer or controller 102.

The controller 102 utilizes the information from the various sensors and indicators, processes this information and in accordance with the preset criteria, controls the various valves and other devices illustrated at the right of FIG. 4. These devices which are controlled are comprised essentially of the various electrically controlled valves such as the hot and cold water valves 28 and 34, the shower/tub valves 54 and 56 and the toilet valve 100.

Some of the criteria utilized by the controller 102 in processing the input information can be permanently preset therein. For example, the controller 102 will be previously programmed to sense a signal from the toilet water level indicator 98 and will automatically generate a signal in response thereto to close the toilet valve 100.

Other criteria may be programmable into the controller 102. Referring to the top of FIG. 4, it can be seen that there are a plurality of programmable inputs. These may be comprised of a plurality of switches, such as rotary thumb switches, potentiometers or other devices for entering information into the controller 102.

For example, water temperature set selector 104 may be used to preset into the controller a predetermined or preset shower, sink or bath temperature. The controller will be provided with additional switching means to determine which of these temperatures is being set. Furthermore, it is preferable that the controller be capable of memorizing or storing a plurality of different temperature settings associated with different family members so that the family member need program the control only once and thereafter merely identify himself when it is desired to take a shower, bath or use the sink.

In a similar manner, the bathtub water level can be preset by selector 106 and the water flow rate can be set by selector 108. The bathtub time set selector 110 is in the nature of a clock or the like and is intended to instruct the controller 102 to begin the bath fill cycle at some predetermined time such as early in the morning. Again, the controller will be capable of storing a number of tub water level values, water flow rate values and tub starting times for the different family members so that each merely has to identify himself to the controller and push a single button to initiate the system desired. All of the relevant criteria relating to that family member will already be preset in the system.

The automatic shower system of the present invention functions in the following manner. Previously set into the controller 102 for a particular family member is the desired water temperature and flow rate which controls the water pressure at the shower head 18. That family member, therefore, need only identify himself to the controller by pushing one of the buttons A-D in the identify switch bank 112. He then pushes button 114 to start the shower.

Referring to FIG. 1, when the shower cycle is initiated, valve 54 is closed by the controller and valve 56 leading to the shower is opened. Valves 28 and 34 in the hot and cold water supply lines are initially opened approximately half way each. Water flows into supply line 36 where it is mixed and the temperature thereof is sensed by the temperature indicator 38. If the water temperature is outside of a preselected range such as below 90° F. or above 100° F., the controller 102 will direct diverter valve 40 to divert all of the incoming water to the drainpipe 46 rather than to the shower head 18. This would be a very common occurrence when the system is first turned on since it normally takes some time for the hot water to be drawn from the domestic water heater.

After the temperature sensor 38 senses that the combined water temperature is within the predetermined range, diverter valve 40 automatically switches so that the water now flows into line 42 and to the shower head 18. As a result of this invention, one can turn the system on from inside the shower standing under the shower head without fear of being shocked by a sudden surge of cold water or burned by a sudden surge of hot water.

During the course of the shower, the controller 102 will automatically make fine adjustments to hot and cold water valves 28 and 34 to keep the temperature at some predetermined optimal temperature. Similarly, the flow rate which controls the shower pressure and which is sensed by flow rate indicator 52 will be constantly adjusted by the controller 102 by similarly making appropriate adjustments to valves 28 and 34. Also, during the course of a shower, should there be a sudden drain on the hot water or cold water supply from elsewhere in the house, temperature sensor 38 will sense the sudden change in the temperature of the incoming water. If this cannot be automatically compensated for by adjusting valves 28 and 34, controller 102 will switch the diverter valve 40 so that all of the water will be diverted away from the shower head 18 and toward the drainpipe 46.

The bathtub system of the invention functions as follows. As with the shower, information concerning a particular family member such as the water temperature and water level are preset in the controller so that the family member need only identify himself in the bank of switches 112. The tub cycle can either be initiated by pushing the start tub button 116 or it can be automatically initiated at some preset future time as described above.

In either case, when the bathtub cycle begins, drain valve 50 is closed, valve 56 to the shower is closed and valve 54 is opened. Valves 28 and 34 are approximately half way opened and water begins to flow into the water supply line 36. Bath oils or other additives from dispenser 59 are automatically added at this time if desired.

During the bath fill cycle, the instantaneous temperature of the incoming water is not as critical as it is during the shower cycle. Accordingly, the diverter valve 40 will generally be in the position allowing water from the water supply line 36 to pass into the line 42. However, should the incoming water be extremely cold or extremely hot, the diverter valve 40 will be moved by the controller 102 to divert water into the drain 46. The purpose for this is to prevent injury to a small child, for example, who may be playing in the tub as it is being filled.

As the water enters the tub 12 through the faucet 16, the temperature is continuously monitored by temperature sensor 22. In response to this sensor, controller 102 will continuously make adjustments to the valves 28 and 34 to bring the bathtub temperature to the preset desired temperature.

The water level within tub 12 is also continuously monitored by water level indicator 20. The desired water level has also been preset in controller 102 and, accordingly, when the water level reaches the predetermined height, the controller 102 will close valves 28 and 34, discontinuing the influx of water.

The controller 102 may also be programmed to add additional water even after the proper level has been reached if it is desired to continuously control the temperature in the bathtub. For example, if the water has turned off since the proper level has been reached and sometime thereafter the temperature sensor 22 senses that the temperature of the bath water has dropped beyond an acceptable level, the controller will automatically open drain valve 50 and will allow additional hot water (within a certain temperature range) to flow into the tub. At some predetermined short time later, valve 50 will again close and the tub will be filled to its proper level with the new incoming hot water. The incoming water will again be shut off when the proper level has been sensed by sensor 20. After the bath has been completed, the bath drain cycle can begin. This can be at either some predetermined time programmed into the controller 102 or the drain cycle can begin by the initiation of a drain cycle switch.

Upon the initiation of the drain cycle, cleaning solution from the supply 58 enters the line 42. Valves 28 and 34 are automatically opened by the controller 102 and water flowing into the line 42 mixes with the cleaning solution. The combined water and cleaning solution is then dispensed into the bathtub through either the faucet 16 or the shower head 18. After a predetermined quantity of the cleaning solution is dispensed into the bathtub, valves 28 and 34 are again closed and drain valve 50 is opened by the controller 102 until all of the water is drained from the tub 12. Alternatively, the tub can first be totally drained and then refilled with water and the cleaning solution.

The automatic controlled sink shown in FIG. 2 functions in a manner similar to the shower. The user identifies himself and then depresses the start sink button 118. Valves 74 and 76 are automatically opened and the combined water temperature is sensed by temperature sensor 80. If the temperature is within the desired temperature range, diverter valve 82 allows the water to flow out of the faucet 62. If, however, the water temperature is outside of that range, the diverter valve is switched by controller 102 so that the water flows directly into the drain 86. As the water is flowing from the faucet 62, the temperature thereof is continuously adjusted by the controller 102 in a manner similar to the shower system described above.

All of the control and input switches and the like for the system of the present invention will preferably be located on a convenient control panel. Additional switches may be located, wherever necessary, in the shower, tub or next to the sink. Furthermore, in addition to all of the main control switches, other switches or controls can be utilized for adjusting the various water temperatures and the like. For example, while utilizing the sink, it may occasionally be desired to turn only the cold water on or only the hot water on or to otherwise change the temperature without adjusting the preset temperatures in the controller 102. Additional automatic override controls or additional input controls can be used for this purpose. Furthermore, manual override valves may be located in various parts of the system so that the same can be used manually if desired.

While certain aspects of the bathroom have been described as being fully automated through the use of controller 102, it should be readily apparent that various other components can be similarly controlled. For example, a digital scale may be employed which utilizes the computer's memory and LED display for providing information concerning a person's weight. The lights including a heat lamp, a heater and an exhaust fan could be automatically controlled. Other devices which could be automatically controlled will be apparent to those skilled in the art. The computer can also be used with speech synthesizers so that, for example, a child can be reminded to brush his teeth. A pulsating shower head can also be created by the computer by rapidly turning the water supply valves on and off.

The present invention may be embodied in other specific forms without departing from the spirit or essential attributes thereof and accordingly reference should be made to the appended claims rather than to the foregoing specification as indicating the scope of the invention.

I claim:

1. In an automated bathroom including:
   a water dispenser;
   hot and cold water supply means;
   mixing means located between said water supply means and said dispenser for mixing the hot and cold water before it is dispensed;
   a supply line connected between said mixing means and said dispenser;
   a drain line connected to said supply line;
   valve means for directing water from said supply line to only the dispenser or only the drain line;
   means for sensing the temperature of the water in the supply line after it has been mixed;
   control means responsive to said sensing means for operating said valve means such that water from said supply line will be directed to said dispenser when the sensed temperature is within a preselected range and such that water from said supply line will be prevented from being dispensed from said dispenser and will be directed to said drain line whenever the sensed temperature is outside said preselected range.

2. The invention as claimed in claim 1 wherein said dispenser is a shower head.

3. The invention as claimed in claim 1 wherein said dispenser is a sink faucet.

4. The invention as claimed in claim 1 wherein said dispenser is a bathtub faucet.

5. The invention as claimed in claim 1 wherein said further including means for automatically adjusting the hot and cold water supply means to bring the mixed water temperature to a predetermined temperature.

6. The invention as claimed in claim 5 including memory storage means for storing information representing a plurality of temperatures and including means for selecting one of said temperatures as said predetermined temperature.

7. The invention as claimed in claim 6 wherein said memory storage means is part of a programmable computer system.

8. The invention as claimed in claim 5 further including means for sensing the flow rate of the water being dispensed by said dispensing means and wherein said means for automatically adjusting the hot and cold water adjusts the flow of the same to bring the sensed flow rate to within a preselected range.

* * * * *